United States Patent
O'Connor et al.

(10) Patent No.: US 12,439,853 B2
(45) Date of Patent: *Oct. 14, 2025

(54) CLOSED LOOP CONTROL OF FILLING MECHANISMS

(71) Applicant: Deere & Company, Moline, IL (US)

(72) Inventors: Kellen E. O'Connor, Clive, IA (US); Jeremy J. Faust, Grimes, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,820

(22) Filed: Mar. 19, 2024

(65) Prior Publication Data

US 2024/0341232 A1     Oct. 17, 2024

Related U.S. Application Data

(63) Continuation of application No. 18/438,080, filed on Feb. 9, 2024, now abandoned, which is a continuation of application No. 17/360,291, filed on Jun. 28, 2021, now Pat. No. 11,930,738.

(51) Int. Cl.
| | |
|---|---|
| *A01D 43/073* | (2006.01) |
| *A01D 34/00* | (2006.01) |
| *G06T 7/20* | (2017.01) |
| *G06T 7/70* | (2017.01) |

(52) U.S. Cl.
CPC ......... *A01D 43/073* (2013.01); *A01D 34/008* (2013.01); *G06T 7/20* (2013.01); *G06T 7/70* (2017.01)

(58) Field of Classification Search
CPC .... A01D 43/073; A01D 34/008; G06T 17/70; G06T 7/20
USPC .......................................................... 701/50
See application file for complete search history.

(56) References Cited

U.S. PATENT DOCUMENTS

| | | |
|---|---|---|
| 4,068,223 A | 1/1978 | Steffen |
| 4,529,348 A | 7/1985 | Johnson et al. |
| 5,575,316 A | 11/1996 | Pollklas |
| 5,749,783 A | 5/1998 | Pollklas |
| 5,957,773 A | 9/1999 | Olmsted et al. |
| 6,097,425 A | 8/2000 | Bahnke et al. |
| 6,216,071 B1 | 4/2001 | Motz |
| 6,587,772 B2 | 7/2003 | Behnke |

(Continued)

FOREIGN PATENT DOCUMENTS

| | | |
|---|---|---|
| DE | 19647622 A1 | 5/1998 |
| DE | 202012103730 U1 | 10/2012 |

(Continued)

OTHER PUBLICATIONS

Non Final Office Action for U.S. Appl. No. 17/196,023 dated Sep. 21. 2023, 20 pages.

(Continued)

*Primary Examiner* — Tuan C To
(74) *Attorney, Agent, or Firm* — Christopher J. Volkmann; KELLY, HOLT & CHRISTENSON PLLC

(57) ABSTRACT

An agricultural harvester has a frame and a spout that is mounted to the frame. A target landing point indicates a position in a receiving vehicle where material is intended to land. A control system detects an actual landing point and automatically controls the spout based on a difference between the actual landing point and the target landing point.

20 Claims, 11 Drawing Sheets

(56) References Cited

U.S. PATENT DOCUMENTS

| | | | |
|---|---|---|---|
| 7,877,181 B2 | 1/2011 | Chervenka et al. | |
| 8,126,620 B2 | 2/2012 | Ringwald et al. | |
| 8,499,537 B2 | 8/2013 | Correns et al. | |
| 8,868,304 B2 * | 10/2014 | Bonefas | A01D 43/087 701/28 |
| 9,002,591 B2 * | 4/2015 | Wang | A01B 69/008 701/50 |
| 9,043,096 B2 | 5/2015 | Zielke et al. | |
| 9,107,344 B2 | 8/2015 | Madsen et al. | |
| 9,119,342 B2 | 9/2015 | Bonefas | |
| 9,188,986 B2 | 11/2015 | Baumann | |
| 9,468,145 B2 | 10/2016 | Coppinger et al. | |
| 9,642,305 B2 | 5/2017 | Nykamp et al. | |
| 9,714,856 B2 * | 7/2017 | Myers | G01F 1/30 |
| 9,949,435 B2 | 4/2018 | Banks, Jr. et al. | |
| 9,949,462 B2 | 4/2018 | Zimmerman | |
| 9,973,710 B2 | 5/2018 | Boydens et al. | |
| 10,252,729 B1 | 4/2019 | Goldman-Shenhar | |
| 10,264,723 B2 | 4/2019 | Gresch et al. | |
| 10,299,433 B2 | 5/2019 | Biggerstaff et al. | |
| 10,368,488 B2 | 8/2019 | Becker et al. | |
| 10,609,864 B2 | 4/2020 | Conrad et al. | |
| 10,830,634 B2 | 11/2020 | Blank et al. | |
| 10,834,872 B2 | 11/2020 | Farley et al. | |
| 11,178,818 B2 | 11/2021 | Brammeier et al. | |
| 2002/0082757 A1 | 6/2002 | Behnke | |
| 2002/0083695 A1 | 7/2002 | Behnke et al. | |
| 2002/0133309 A1 | 9/2002 | Hardt | |
| 2003/0174207 A1 | 9/2003 | Alexia et al. | |
| 2004/0004544 A1 | 1/2004 | William Knutson | |
| 2006/0025894 A1 | 2/2006 | O'Connor et al. | |
| 2006/0240884 A1 | 10/2006 | Klimmer | |
| 2007/0135190 A1 | 6/2007 | Diekhans et al. | |
| 2008/0083475 A1 | 4/2008 | Lamb | |
| 2009/0044505 A1 | 2/2009 | Huster et al. | |
| 2010/0042297 A1 | 2/2010 | Foster et al. | |
| 2010/0066517 A1 | 3/2010 | Posselius et al. | |
| 2010/0266377 A1 | 10/2010 | Yoder | |
| 2010/0285855 A1 | 11/2010 | Chervenka et al. | |
| 2010/0332051 A1 | 12/2010 | Kormann | |
| 2011/0061762 A1 | 3/2011 | Madsen et al. | |
| 2011/0213531 A1 | 9/2011 | Farley et al. | |
| 2011/0307149 A1 | 12/2011 | Pighi et al. | |
| 2012/0021386 A1 | 1/2012 | Anderson et al. | |
| 2012/0215381 A1 | 8/2012 | Wang et al. | |
| 2012/0215409 A1 * | 8/2012 | Wang | A01D 43/085 701/50 |
| 2012/0216394 A1 | 8/2012 | Kitaura et al. | |
| 2012/0221213 A1 | 8/2012 | Seeger | |
| 2012/0263560 A1 | 10/2012 | Diekhans et al. | |
| 2012/0265412 A1 | 10/2012 | Diekhans et al. | |
| 2012/0302299 A1 | 11/2012 | Behnke et al. | |
| 2013/0096782 A1 * | 4/2013 | Good | A01D 41/1217 701/50 |
| 2013/0166344 A1 | 6/2013 | Grothaus et al. | |
| 2013/0231823 A1 | 9/2013 | Wang et al. | |
| 2014/0082442 A1 | 3/2014 | Whetsel | |
| 2014/0083556 A1 | 3/2014 | Darr et al. | |
| 2014/0113694 A1 * | 4/2014 | Coppinger | F16J 15/02 277/590 |
| 2014/0224377 A1 | 8/2014 | Bonefas | |
| 2014/0311113 A1 | 10/2014 | Bonefas | |
| 2015/0245560 A1 | 9/2015 | Middelberg et al. | |
| 2015/0264866 A1 | 9/2015 | Foster et al. | |
| 2015/0308070 A1 | 10/2015 | Deines | |
| 2016/0009509 A1 | 1/2016 | Bonefas et al. | |
| 2016/0168187 A1 | 6/2016 | Romesberg et al. | |
| 2016/0348324 A1 | 12/2016 | Engelmann et al. | |
| 2017/0042088 A1 | 2/2017 | Nykamp et al. | |
| 2017/0082442 A1 | 3/2017 | Anderson | |
| 2017/0088147 A1 | 3/2017 | Tentinger et al. | |
| 2017/0193713 A1 | 7/2017 | So et al. | |
| 2017/0208742 A1 | 7/2017 | Ingibergsson et al. | |
| 2017/0336787 A1 | 11/2017 | Pichlmaier et al. | |
| 2018/0022559 A1 | 1/2018 | Knutson | |
| 2018/0334136 A1 | 11/2018 | Chaston et al. | |
| 2019/0261560 A1 | 8/2019 | Jelenkovic | |
| 2019/0261561 A1 | 8/2019 | Heitmann | |
| 2019/0332987 A1 | 10/2019 | Marsolek et al. | |
| 2020/0073543 A1 | 3/2020 | Koch et al. | |
| 2020/0090094 A1 | 3/2020 | Blank | |
| 2020/0128740 A1 | 4/2020 | Suleman | |
| 2020/0133262 A1 | 4/2020 | Suleman et al. | |
| 2020/0178049 A1 | 6/2020 | Suleman et al. | |
| 2020/0214205 A1 | 7/2020 | Smedt et al. | |
| 2020/0319655 A1 | 10/2020 | Desai et al. | |
| 2020/0325655 A1 | 10/2020 | Hageman et al. | |
| 2020/0339132 A1 | 10/2020 | Swift et al. | |
| 2022/0122197 A1 | 4/2022 | Hanrieder | |
| 2023/0247942 A1 | 8/2023 | De Jager et al. | |
| 2024/0037806 A1 | 2/2024 | Christiansen et al. | |

FOREIGN PATENT DOCUMENTS

| | | | |
|---|---|---|---|
| DE | 102019202950 A1 | 9/2019 | |
| EP | 1977640 A1 | 10/2008 | |
| EP | 1977640 B1 | 2/2011 | |
| EP | 2311307 A1 | 4/2011 | |
| EP | 2311307 B1 | 12/2011 | |
| EP | 2798939 A1 | 11/2014 | |
| EP | 2929773 A1 | 10/2015 | |
| EP | 2929773 B1 | 1/2018 | |
| EP | 331500 A1 | 5/2018 | |
| EP | 3315007 A1 | 5/2018 | |
| EP | 3409097 A1 * | 12/2018 | A01D 43/073 |
| EP | 3643159 A1 | 4/2020 | |
| EP | 3409097 B1 | 7/2020 | |
| EP | 3760026 A1 | 1/2021 | |
| EP | 3316218 B1 | 4/2021 | |
| EP | 2510775 A1 | 10/2021 | |
| WO | 2011104085 A1 | 9/2011 | |
| WO | 2015011237 A2 | 1/2015 | |
| WO | WO-2016079580 A1 * | 5/2016 | A01D 41/1217 |
| WO | 2020038810 A1 | 2/2020 | |

OTHER PUBLICATIONS

Extended European Search Report and Written Opinion Issued in European Patent Application No. 22177644.6, dated Nov. 25, 2022, in 08 pages.

U.S. Appl. No. 17/321,584, filed May 17, 2021 Application and Drawings, 47 pages.

U.S. Appl. No. 17/386,975, filed Jul. 28, 2021, Application and Drawings, 54 pages.

U.S. Appl. No. 17/360,282, filed Jun. 28, 2021, Application and Drawings, 51 pages.

U.S. Appl. No. 17/210,691, filed Mar. 24, 2021, Application and Drawings, 60 pages.

U.S. Appl. No. 17/196,023, filed Mar. 9, 2021, Application and Drawings, 53 pages.

Extended European Search Report and Written Opinion issued in European Patent Application No. 22156203.6, dated Jul. 2022, in 11 pages.

U.S. Appl. No. 17/321,564 Final Office Action dated Aug. 15, 2022, 35 pages.

Extended European Search Report issued in European Patent Application No. 22159163.9. dated Aug. 3, 2022, 7 pages.

U.S. Appl. No. 17/321,584 Office Action dated Oct. 31, 2022, 15 pages.

Extended European Search Repost and Written Opinion issued In European Patent Application No. 22177842.0 dated Nov. 11, 2022, 8 pages.

U.S. Appl. No. 17/321,584 Office Action dated May 11, 2022, 34 pages.

U.S. Appl. No. 17/321,584 Office Action dated Jan. 26, 2022, 24 pages.

U.S. Appl. No. 17/321,684 Office Action dated Sep. 17. 2021, 25 pages.

(56) References Cited

OTHER PUBLICATIONS

U.S. Appl. No. 17/210,691 Non-Final Office Action dated Nov. 11, 2023, 8 pages.
Extended European Search Report issued in European Patent Application No. 22170901.7, dated Feb. 24, 2023, 10 pages.
Extended European Search Report issued in European Patent Application No. 22183092.0, dated Mar. 24, 2023, 10 pages.
U.S. Appl. No. 17/321,584 Non Final Office Action dated Feb. 13, 2023, 9 pages.
Application and Drawings for U.S. Appl. No. 17/360,291, filed Jun. 28, 2021, 43 pages.

* cited by examiner

CLOSED LOOP CONTROL OF FILLING MECHANISMS

CROSS-REFERENCE TO RELATED APPLICATION

The present application is a continuation of and claims priority of U.S. patent application Ser. No. 18/438,080, filed Feb. 9, 2024, which is a continuation of and claims priority of U.S. patent application Ser. No. 17/360,291, filed Jun. 28, 2021, the content of which is hereby incorporated by reference in its entirety.

FIELD OF THE DESCRIPTION

The present description relates to mobile work machines. More specifically, the present description relates to implementing closed loop control of filling mechanisms when filling a receiving vehicle.

BACKGROUND

There are a wide variety of different types of mobile work machines such as agricultural vehicles and construction vehicles. Some vehicles include harvesters, such as forage harvesters, sugar cane harvesters, combine harvesters, and other harvesters, that harvest grain or other crop. Such harvesters often unload into carts which may be pulled by tractors or semi-trailers as the harvesters are moving. Some construction vehicles include vehicles that remove asphalt or other similar materials. Such machines can include cold planers, asphalt mills, asphalt grinders, etc. Such construction vehicles often unload material into a receiving vehicle, such as a dump truck or other vehicle with a receiving vessel.

As one example, while harvesting in a field using a forage harvester, an operator attempts to control the forage harvester to maintain harvesting efficiency, during many different types of conditions. The wind speed and direction, soil conditions, crop conditions, and other things can all change. This may result in the operator changing control settings. This means that the operator needs to devote a relatively large amount of attention to controlling the forage harvester.

At the same time, a semi-truck or tractor-pulled cart is often in position relative to the forage harvester (e.g., behind the forage harvester or alongside the forage harvester) so that the forage harvester can fill the truck or cart while moving through the field. In some current systems, this requires the operator of the forage harvester to control the position of the unloading spout and flap so that the truck or cart is filled evenly, but not overfilled. Even a momentary misalignment between the spout and the truck or cart may result in hundreds of pounds of harvested material being dumped on the ground, or elsewhere, rather than in the truck or cart.

Other harvesters such as combine harvesters and sugar cane harvesters, can have similar difficulties. Also, construction vehicles can be difficult to operate while attempting to maintain alignment with a receiving vehicle.

The discussion above is merely provided for general background information and is not intended to be used as an aid in determining the scope of the claimed subject matter.

SUMMARY

An agricultural harvester has a frame and a spout that is mounted to the frame. A target landing point indicates a position in a receiving vehicle where material is intended to land. A control system detects an actual landing point and automatically controls the spout based on a difference between the actual landing point and the target landing point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present discussion proceeds with respect to an agricultural harvester, but it will be appreciated that the present discussion is also applicable to construction machines as well, such as those discussed elsewhere herein. As discussed above, it can be very difficult for an operator to maintain high efficiency in controlling a harvester, and also to optimally monitor the position of the receiving vehicle. This difficulty can even be exacerbated in windy conditions in which the material may be blown in one direction or another.

In order to address these issues, some automatic cart filling control systems have been developed to automate portions of the filling process. One such automatic fill control system uses a stereo camera on the spout of the harvester to capture an image of the receiving vehicle. An image processing system determines dimensions of the receiving vehicle and the distribution of the crop deposited inside the receiving vehicle. The system also detects crop height within the receiving vehicle, in order to automatically aim the spout toward empty spots and control the flap position to achieve a more even fill, while reducing spillage. Such systems can fill the receiving vehicle according to a fill strategy (such as front-to-back, back-to-front, etc.) that is set by the operator or that is set in other ways.

Also, wind conditions can greatly affect the accuracy of a filling operation. When the receiving vehicle is traveling behind the loading vehicle (e.g., when the grain cart is following the harvester), the material can travel from the loading vehicle to the receiving vehicle in excess of thirty-five feet through the air. Therefore, a cross wind can divert the path of the material so the material does not hit the target landing point in the receiving vehicle and may in fact miss the receiving vehicle completely. The same can happen when the receiving vehicle is traveling alongside the loading vehicle as well. In such scenarios, the operator often manually adjusts a lateral offset of the position of the spout in a fill control system to accommodate for the wind.

The present description thus proceeds with respect to a mobile work machine that detects a target landing position indicating an intended landing position of material in a receiving vehicle and detects or senses an actual (or current) landing position and identifies a difference between the actual landing position and the target landing position. A control system automatically controls the machine to offset the position of the spout based on the difference between the target landing position and the actual landing position.

Figure 1:
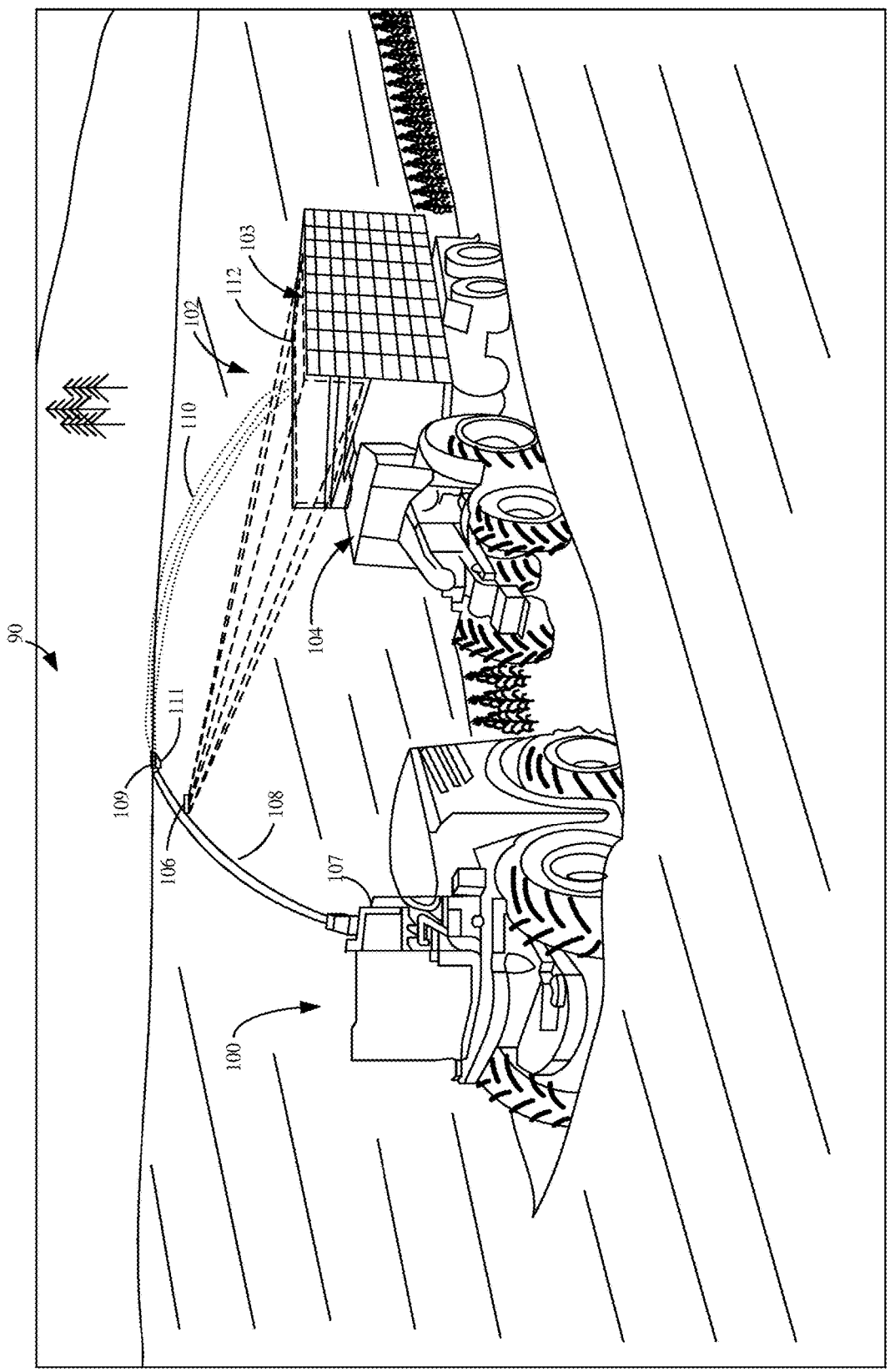
FIG. 1 is a pictorial illustration of one example of a work machine which comprises a forage harvester filling a receiving vehicle, with the receiving vehicle in a position behind the forage harvester.

FIG. 1 is a pictorial illustration showing one example of a self-propelled forage harvester 100 filling a tractor-pulled grain cart (or receiving vehicle) 102. Cart 102 thus defines an interior that forms a receiving vessel 103 for receiving harvested material through a receiving area 112. In the example shown in FIG. 1, a tractor 104, that is pulling grain cart 102, is positioned directly behind forage harvester 100. Also, in the example illustrated in FIG. 1, forage harvester 100 has a camera 106 mounted on the spout 108 through which the harvested material 110 is traveling. The spout 108 can be pivotally or rotationally mounted to a frame 107 of harvester 100. Camera 106 can be a stereo-camera or a mono-camera that captures an image (e.g., a still image or video) of the receiving area 112 of cart 102. In the example shown in FIG. 1, the receiving area 112 is defined by an upper edge of the walls of cart 102.

The harvested material 110 may travel a relatively long distance, such as in excess of thirty-five feet, through the air. Therefore, the trajectory and direction of travel of material 110 can be significantly affected by wind. A crosswind, for instance, (e.g., a wind in a direction transverse to a direction of travel of the material 110) can push the landing point of material 110 to an undesirable position that may even be outside of the receiving vessel 103 of receiving vehicle 102.

When harvester 100 has an automatic fill control system that includes image processing, as discussed above, the automatic fill control system can receive a target landing point for the material in cart 102 and gauge the height of harvested material in cart 102, and sense the actual landing position of that material in cart 102. The system thus automatically controls an offset to the position of spout 108 and flap 109 to accommodate for the wind and to direct the trajectory of material 110 into the receiving area 112 of cart 102 at the target landing position. The automatic fill control of material system can maintain the offset as it fills cart 102 to obtain an even fill throughout the entire length and width of cart 102, while not overfilling cart 102. By automatically, it is meant, for example, that the operation is performed without further human involvement except, perhaps, to initiate or authorize the operation.

Figure 2:
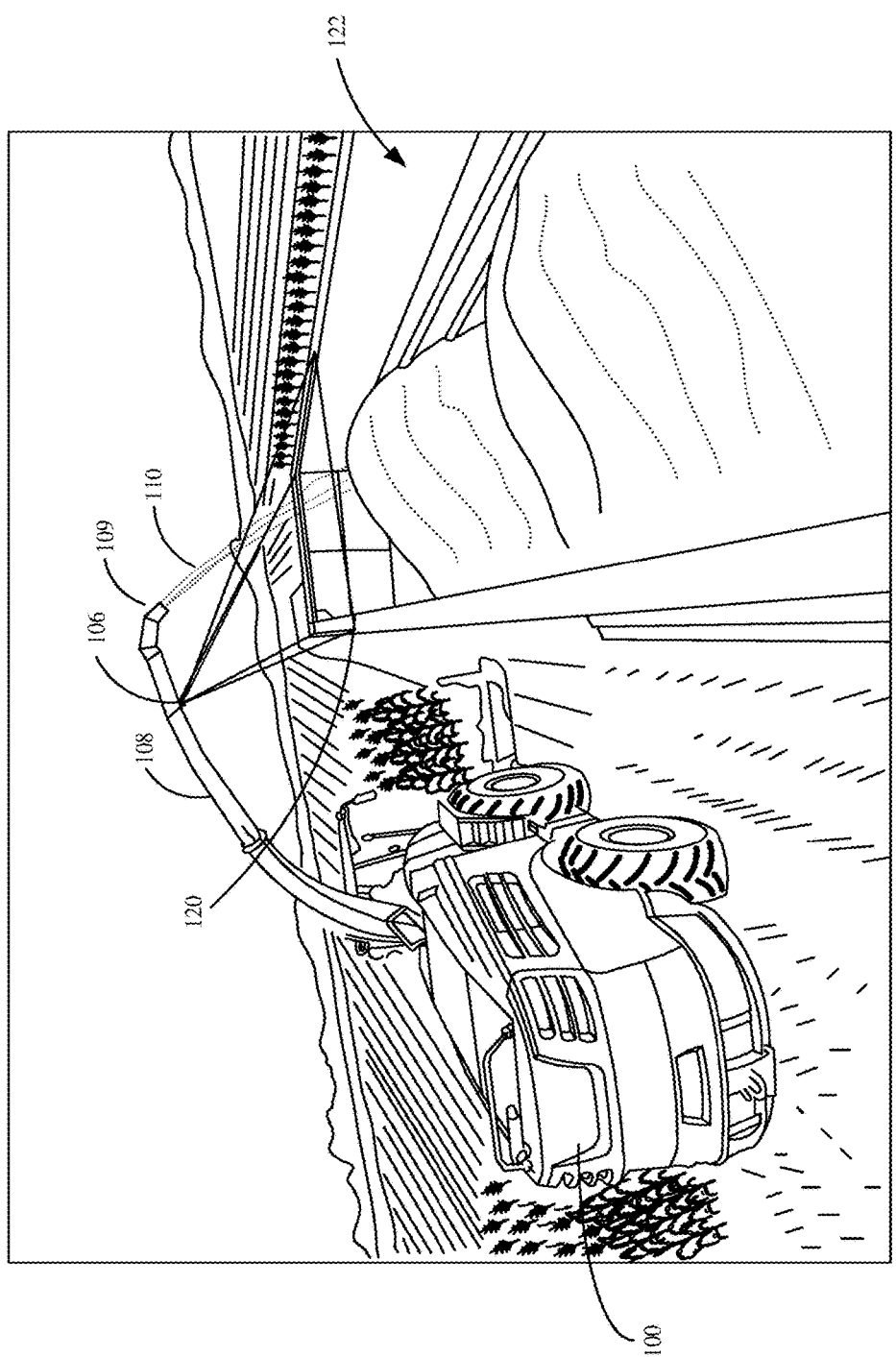
FIG. 2 is a pictorial illustration of one example of a work machine which comprises a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor is pulling semi-trailer 122 alongside forage harvester 100. An automatic fill control system detects a target landing point in receiving vehicle 122. The target landing point can be detected based on an operator input or an automated input or a default input. Therefore, the spout 108 and flap 109 are positioned to unload the harvested material 110 to fill trailer 122 at the target landing point according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify an actual landing point (or a current landing point) of the harvested material in trailer 122 (or an estimate of the actual or current landing point). Wind or other things can cause the actual (or current) landing point to deviate from the target landing point. Therefore, the automatic fill control system can introduce an offset in controlling the spout and flap position to accommodate for the affect of the wind, based on the difference between the target landing point and the actual (or current) landing point.

In other examples, where machine 100 is a combine harvester, it may be that the spout 108 is not moved relative to the frame during normal unloading operations. Instead, the relative position of the receiving vehicle 102, 122 and the combine harvester is changed in order to fill the receiving vessel 103 as desired. Thus, if a front-to-back fill strategy is to be employed, then the relative position of the receiving vessel, relative to the combine harvester, is changed so that the spout is first filling the receiving vessel at the front end, and then gradually fills the receiving vessel moving rearward. In such an example, the combine harvester and towing vehicle may have machine synchronization systems which communicate with one another. When the relative position of the two vehicles is to change, then the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vessel that is currently being filled is approaching its desired fill level. In that case, the machine synchronization system on the combine harvester can send a "nudge" signal to the machine synchronization system on the towing vehicle. The nudge, once received by the machine synchronization system on the towing vehicle, causes the towing vehicle to momentarily speed up or slow down, thus nudging the position of the receiving vessel forward or rearward, respectively, relative to the combine harvester.

Figure 3:
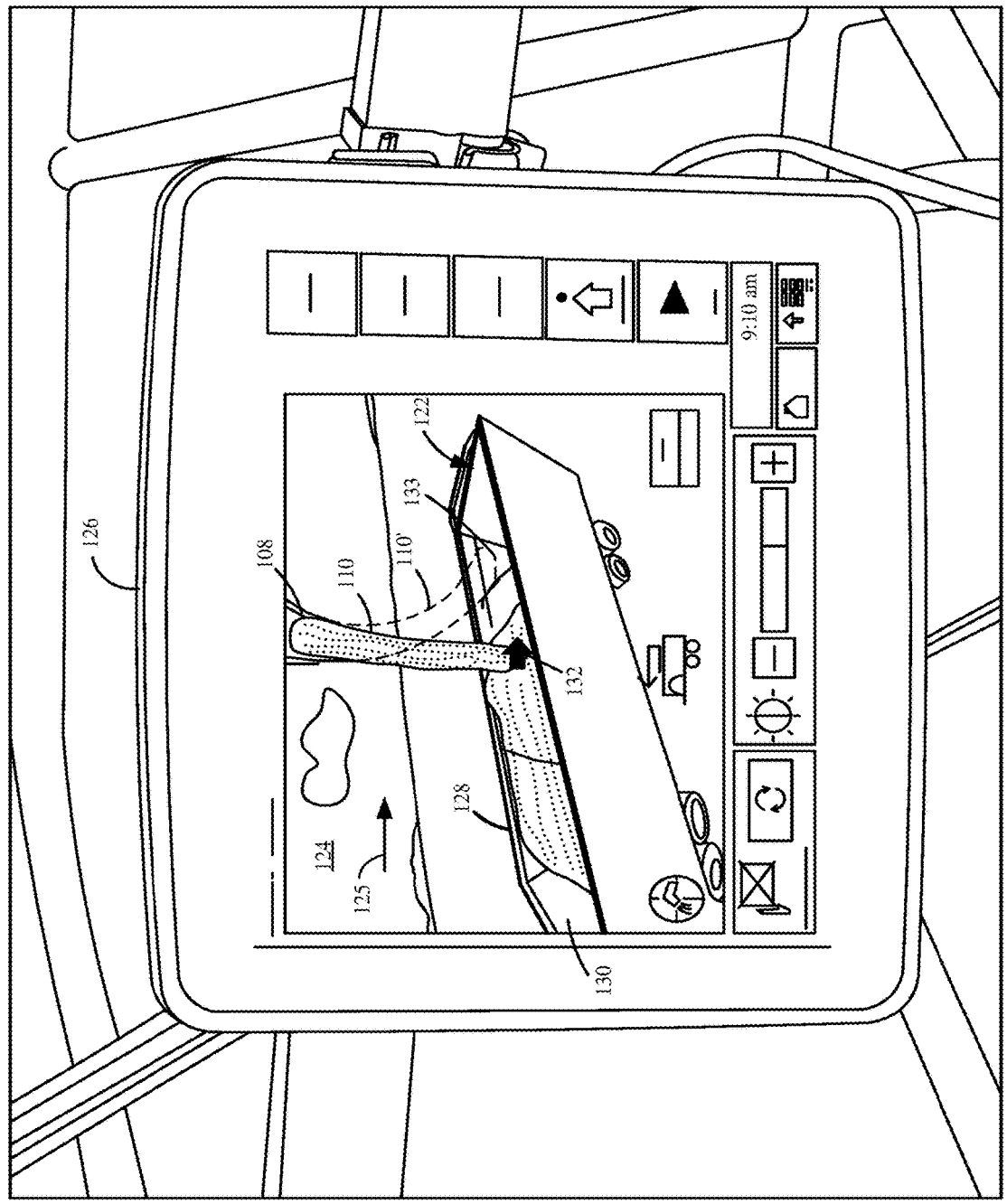
FIG. 3 is a pictorial illustration of an operator display showing video of a filling operation with the receiving vehicle in a position along side the forage harvester.

FIG. 3 is a pictorial illustration showing one example of an operator interface display 124 that can be displayed on a display mechanism 126, for the operator in an operator compartment of forage harvester 100. The operator interface display 124 in FIG. 3 shows a view of images (or video) captured by camera 106 of material 110 entering trailer 122. An image processing system on harvester 100 illustratively identifies the perimeter of the opening 128 in trailer 122 as generally lying in a plane and also processes the image of the material 110 in trailer 122 to determine where the trajectory of material 110 intersects with the plane that opening 128 lies in to identify the actual (or current) landing point of material 110 in trailer 112. The image processor can also determine the fill height relative to opening 128. The perimeter defining opening 128 can be visually enhanced by overlaying a visual overlay over the opening 128 so that the operator can easily identify the opening 128, as it is being recognized by the image processing system. The target landing point may be identified on display 124 by an indicator 132.

In some cases there may be a cross wind that is transverse to the trajectory of material 110. In the example shown in FIG. 3, the wind is in the direction indicated by arrows 125. This may cause the trajectory of material 110 to move to the position 110' shown in phantom so that instead of landing at the target landing point identified by indicator 132, the material lands at an actual landing point 133. It will also be noted that, if the wind is strong enough, the actual landing point may be outside of trailer 122. In current systems, the operator would then need to change an offset value to move the target landing point to the left in FIG. 3 to offset the affect of the wind. The present system, by contrast, automatically detects the difference between target landing point 132 and the current landing point 133 and automatically generates control signals to offset the affects of the wind.

As mentioned, the target landing point may be input by the operator. For example, where the display screen on mechanism 126 is a touch sensitive display screen, then the operator may simply touch the screen in the area of the target landing point. The touch gesture is detected by the fill control system and the fill control system automatically generates control signals to move spout 108 so that it is depositing material 110 at the target landing point.

Generating the control signals to reposition spout 108 can be done in different ways. For instance, once the operator touches or otherwise selects (such as with a point and click device) an area of display 124, the control system identifies the pixel or pixel sets that were selected (e.g., touched or otherwise selected) and, from those pixels, identifies a corresponding physical area or landing point within trailer 122. The control system can then calculate the position that spout 108 needs to be in based on the density of the material 110 and the kinematics of the spout and flap and the velocity of the material 110 or estimated velocity of the material 110 as it exits the spout 108 in order to fill material 110 in that particular landing point in trailer 122.

It should also be noted that, in one example, forage harvester 100 may have an automatic fill control system (or active fill control system) which fills trailer 122 according to a fill strategy (such as a back-to-front fill strategy, front-to-back fill strategy, etc.). In that case, the indicator 132 may be displayed to show the current location where material 110 is being loaded (or is intended to be loaded) into trailer 122 through spout 108 and the direction that spout 108 will be moving relative to trailer 122 as the filling operation continues. It can be seen in FIG. 3, for instance, that indicator 132 is an arrow pointing in the front-to-back direction. The location of arrow 132 on the representation of trailer 122 indicates the target landing point, while the direction of the arrow indicates the direction that spout 108 will be moved relative to trailer 122 in executing the selected front-to-back fill strategy. Therefore, in one example, even when an offset is applied to the spout 108 and flap 109 to offset the affect of wind, the indicator 132 remains in place to indicate the location of the target landing point. These are just some examples of how the operator interface display 124 can be generated.

Figure 4:
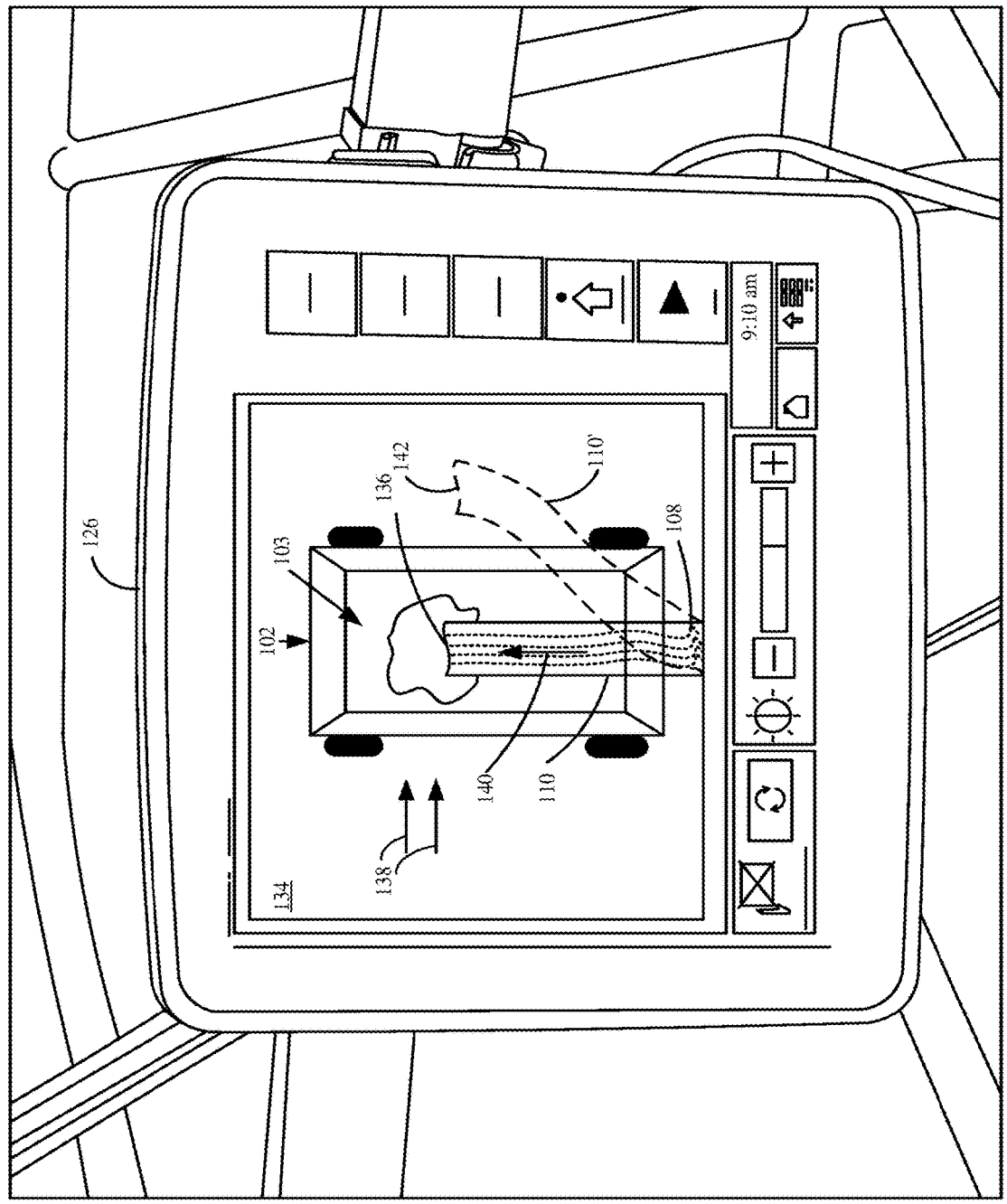
FIG. 4 is a pictorial illustration of an operator display showing video of a filling operation with the receiving vehicle in a position behind the forage harvester.

FIG. 4 is another example of an operator interface display 134 which can be generated for the operator of harvester 100. Some items are similar to those shown in FIG. 3 and they are similarly numbered. FIG. 4 shows a view from camera 106 of trailer or cart 102 that is following behind harvester 100. Material 110 is provided from spout 108 to the receiving vessel 103 defined by cart 102. In the example shown in FIG. 4, the target landing point is represented by 136. However, in some cases, a cross wind that is transverse to the trajectory of material 110 can be present. In the example shown in FIG. 4, the winds directed in a direction indicated by arrow 138. The wind is thus directed in a transverse direction relative to the trajectory of material 110, which is indicated by arrow 140. This can blow material 110 so that its trajectory is shifted in the direction of arrows 138 to a position, such as that shown at 110', and illustrated in phantom, in FIG. 4. Thus, the actual landing point may be outside of cart 102, such as the landing point represented by 142 in FIG. 4.

The automatic fill control system can then sense the actual landing point 142, determine a difference between the target landing point 136 and the actual landing point 142. Based on the difference the automatic fill control system can calculate an offset so that spout 108 is redirected to the left (against the wind) in FIG. 3 so that the target landing point coincides with the actual landing point.

Figure 5:
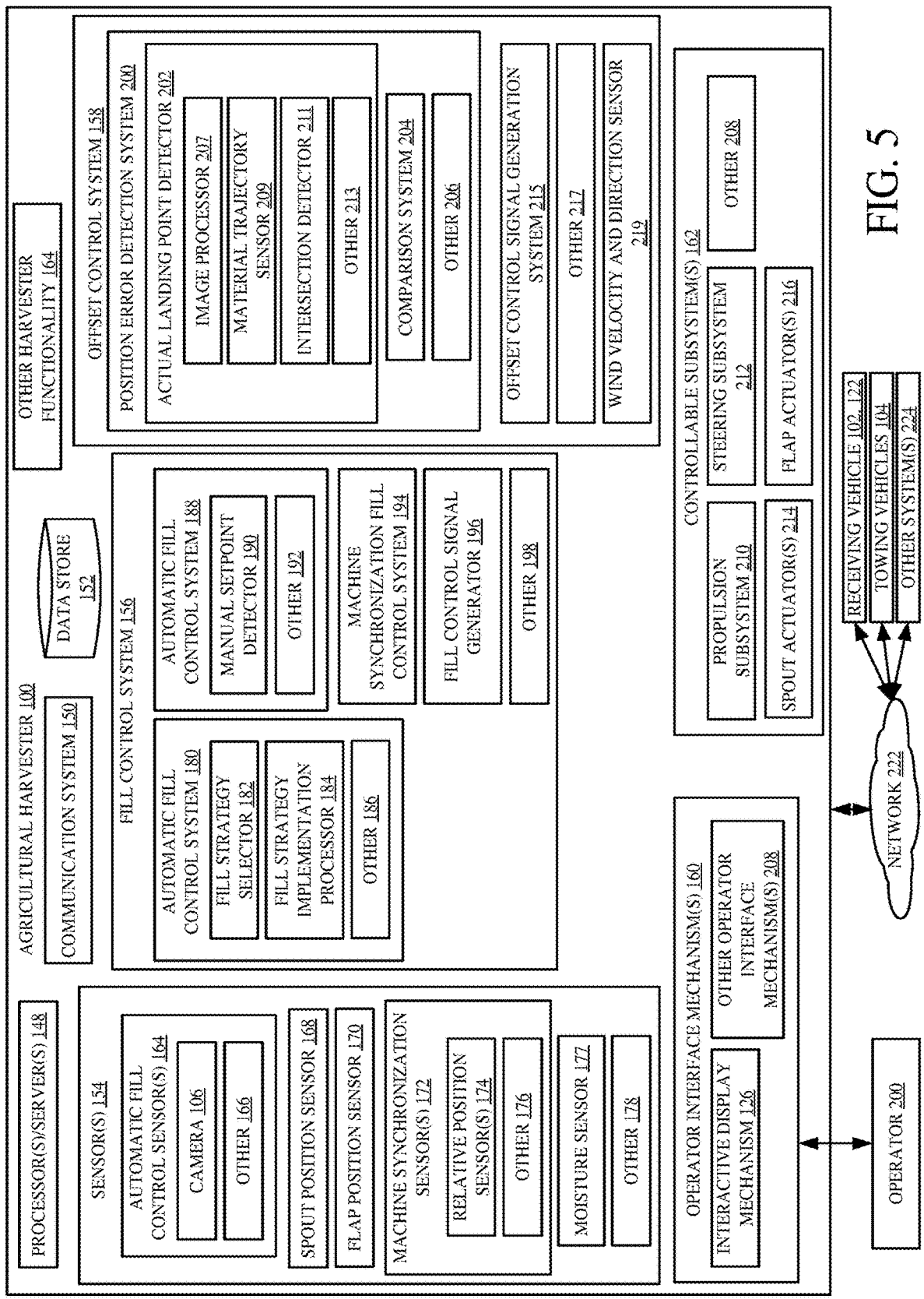
FIG. 5 is a block diagram of one example of an agricultural harvester.

FIG. 5 is a block diagram showing one example of a mobile work machine which comprises agricultural harvester 100, in more detail. Agricultural harvester 100, in the example shown in FIG. 5, includes one or more processors or servers 148, communication system 150, data store 152, sensors 154, fill control system 156, offset control system 158, operator interface mechanisms 160, controllable subsystems 162, and other harvester functionality 164. Sensors 154 can include automatic fill control sensors 164 that are used by fill control system 156. Sensors 164 can include camera 106 (which may be a mono-camera, stereo-camera or another type of camera) and other sensors 166. The other sensors can include such things as Doppler sensors, RADAR sensors, other image sensors or any of a wide variety of other types of sensors. Sensors 154 can also include spout position sensor 168 and flap position sensor 170. Spout position sensor 168 illustratively senses the position of spout 108 relative to the frame of harvester 100. Sensor 168 can do this by sensing the position of an actuator that drives movement of spout 108 relative to the frame of harvester 100, or sensor 168 can be a rotary position sensor, a linear sensor, a potentiometer, a Hall Effect sensor, or any other of a wide variety of sensors that can sense the position of spout 108 relative to the frame of harvester 100. Similarly, flap position sensor 170 can be a sensor that senses the position of the flap 109. Thus, sensor 170 can be a rotary position sensor, a linear sensor, a potentiometer, a Hall Effect sensor, a sensor that senses a position of an actuator that drives movement of flap 109, or any of a wide variety of other sensors.

Sensors 154 can also include machine synchronization sensors 172. Sensors 172 can include relative position sensors 174 that sense the relative position of the harvester, relative to the receiving vehicle. Such sensors can include RADAR sensors, Doppler sensors, image or other optical sensors, or a wide variety of other relative position sensors. The relative position sensors 174 can also include position sensors (such as a GPS receiver, or another GNSS sensor, or another position sensor) that senses the position of harvester 100. This can be used, in conjunction with another position sensor on the receiving vehicle, to determine the position of the two vehicles relative to one another. The machine synchronization sensors 172 can include other sensors 176, and sensors 154 can include a crop moisture sensor 177 and a wide variety of other sensors 178 as well.

Fill control system 156 illustratively controls operations of various parts of harvester 100 (and possibly the towing vehicle 104) to fill the receiving vehicle 102, 122, as desired. Fill control system 156 can include automatic fill control system 180 (which, itself, can include fill strategy selector 182, fill strategy implementation processor 184, and other items 186), manual fill control system 188 (which, itself can include manual set point detector 190 and other items 192), and/or machine synchronization fill control system 194. Fill control system 156 can also include fill control signal generator 196 and other items 198. Offset control system 158 can include position error detection system 200 which can, itself, include actual landing point detector 202, comparison system 204 and other items 206. Actual landing point detector 202 can include image processor 207, material trajectory sensor 209, intersection detector 211, and other items 213. Offset control system 158 can also include offset control signal generation system 215, wind velocity and direction sensor 219, and other items 217. Operator interface mechanisms 160 can include interactive display mechanism 126 and a variety of other operator interface mechanisms 208. Controllable subsystems 162 can include propulsion subsystem 210, steering subsystem 212, one or more spout actuators 214, one or more flap actuators 216 and other items 218. FIG. 5 also shows that operator 220 can interact through operator interface mechanism 160 to control and manipulate agricultural harvester 100. Further, FIG. 5 shows that harvester 122 is connected over network 222 to receiving vehicle 102, 122, towing vehicle 104 and/or it can be connected to other systems 224. Before describing the overall operation of agricultural harvester 100 in more detail, a brief description of some of the items in agricultural harvester 100, and their operation, will first be provided.

Communication system 150 can facilitate communication among the items of harvester 100 and with other items over network 222. Network 222 can be a wide area network, a local area network, a near field communication network, a cellular communication network, or any of a variety of other networks or combinations of networks. Therefore, communication system 150 can use a controller area network (CAN) bus or other controllers to facilitate communication of the items on harvester 100 with other items. Communication on system 150 can also be different kinds of communication systems, depending on the particular network or networks 222 over which communication is to be made.

Operator interface mechanisms 160 can be a wide variety of different types of mechanisms. Interactive display mechanism 126 can be a display mechanism, such as that shown in FIGS. 3 and 4, or mechanism 126 can be a display mechanism on a mobile device, such as a tablet computer, a smartphone, etc., that is carried by the operator 200 and/or mounted in the operator compartment of harvester 100. Thus, interactive display mechanism 126 can be a touch sensitive display mechanism, a display mechanism that receives inputs through a point and click device, or other kinds of display mechanisms.

Other operator interface mechanisms 208 can include a steering wheel, levers, buttons, pedals, a microphone and speaker (where speech recognition and speech synthesis are provided), joysticks, or other mechanical, audio, visual, or haptic mechanisms that can be used to provide outputs to operator 220 or to receive inputs from operator 220.

Controllable subsystems 162 can be controlled by various different items on harvester 100. Propulsion subsystem 210 can be an engine that drives ground-engaging elements (such as wheels or tracks) through a transmission, hydraulic motors that are used to drive ground-engaging elements, electric motors, direct drive motors, or other propulsion systems that are used to drive ground-engaging elements to propel harvester 100 in the forward and rearward directions. Propulsion subsystem 110 can illustratively be controlled with a throttle to increase or decrease the speed of travel of harvester 100.

Steering subsystem 212 can be used to control the heading of harvester 100. One or more spout actuators 214 are illustratively configured to drive rotation or other movement of spout 108 relative to the frame 107 of harvester 100. Actuators 214 can be hydraulic actuators, electric actuators, pneumatic actuators, or any of a wide variety of other actuators. Similarly, one or more flap actuators 216 are used to drive the position of flap 109 relative to spout 108. The flap actuators 216 can also be hydraulic actuators, electric actuators, pneumatic actuators, or any of a wide variety of other actuators.

Fill control system 156 can use automatic fill control system 180 to perform automated fill control to automatically execute a fill strategy in filling one of the receiving vehicles 102, 122. Therefore, fill strategy selector 182 can detect a user input selecting a fill strategy, or another input selecting a fill strategy and access data store 152 for a stored fill algorithm that can be executed to perform the selected fill strategy. For instance, where the selected fill strategy is a back-to-front strategy, the algorithm will direct filling of the receiving vehicle beginning with a target landing point at the back of the receiving vehicle and moving to a target landing point toward the front of the receiving vehicle. Other fill strategies can be selected as well. Fill strategy implementation processor 184 receives inputs from the automatic fill control sensors 164, spout position sensor 168, and flap position sensor 170, and can also access kinematic information for spout 108, and generates an output to fill control signal generator 196 based upon the inputs from the sensors, to execute the desired automatic fill control strategy. Fill control signal generator 196 can generate control signals to control any of the controllable subsystems 262 (or other items) to execute the fill strategy being implemented by fill strategy implementation processor 184.

Manual fill control system 188 can use manual set point detector 190 to detect a manual input from operator 220 (e.g., through interactive display mechanism 126) to identify a target landing point in the receiving vehicle 102, 122 where the operator 200 desires the filling operation to be performed. Manual fill control system 188 can then generate outputs to fill control signal generator 196 which generates control signals to control the controllable subsystems 162 so that filling commences at the manually identified target landing point in the receiving vehicle 102, 122.

Machine synchronization fill control system 194 can receive operator inputs or other inputs, as well as sensor inputs from sensors 154 to generate outputs to fill control signal generator 196 in order to synchronize the positions of agricultural harvester 100 and receiving vehicle 102, 122 so that a desired filling operation is performed. For instance, machine synchronization control system 194 can receive sensor inputs identifying that the current position that is being filled in receiving vehicle 102, 122, is at a desired fill level so that the receiving vehicle should move forward or rearward relative to agricultural harvester 100. Machine synchronization fill control system 194 then generates an output to fill control signal generator 196 indicating this. Fill control signal generator 196 can generate an output either to controllable subsystems 162, or communication system 150, or both, based on the inputs from machine synchronization fill control system 194. For instance, where the output from system 194 indicates that the receiving vehicle 102, 122 should move forward relative to agricultural harvester 100, then fill control signal generator 196 can control communication system 150 to communicate with a corresponding machine synchronization fill control system 194 on towing vehicle 104 indicating that towing vehicle 104 should "nudge" forward relative to the harvester 100 by momentarily increasing its ground speed and then returning to its current ground speed. Alternatively, or in addition, fill control signal generator 196 can generate control signals to control the propulsion subsystem 210 on agricultural harvester 100 to momentarily change the speed of agricultural harvester 100 so that the position of the receiving vehicle 102, 122 relative to agricultural harvester 100 changes as desired.

As one example of calculating and implementing an offset, offset control system 158 detects any offset between the target landing point of material 110 in the receiving vehicle and the actual landing point, due to wind or other influences. Position error detection system 200 detects the difference between the two landing points and offset control signal generation system 215 generates offset signals indicative of the amount of offset or correction that needs to be applied to the position of the spout 108 and flap 109, or to the relative position of the harvester and receiving vehicle, in order to accommodate for the error between the target landing point and the actual landing point. The control signals output from offset control signal generator system 215 can be provided to fill control system 156 which can use those signals in order introduce the offset into the control of spout actuators 214, flap actuators 216, propulsion subsystem 210, and/or steering subsystem 212. In another example, the signals generated by offset control signal generation system 215 can be provided directly to controllable subsystems 162 to control the actuators and/or other subsystems 162 in order to correct for the error between the target landing point and the actual landing point.

Actual landing point detector 202 illustratively detects the actual landing point (e.g., an estimate of the current landing point) based upon a sensor value received from at least one of sensors 154. The sensor value can be an image from camera 106 (which may be video or a still image). Image processor 207 can process the image to identify the actual landing point. In one example, image processor 207 captures the image and processes it so that it can be acted on by material trajectory sensor 209. In one example, material trajectory sensor 209 identifies the stream of material 110 exiting the spout 108 and fits a curve through the stream of material 110 indicative of the trajectory of material 110. Image processor 207 can also identify an outline of the receiving vehicle, such as the outline of the upper edge of receiving vessel 103 shown in FIG. 4, as lying on a plane. Intersection detector 211 detects an intersection between the trajectory of material 110 and the plane in which the opening of receiving vessel 103 lies. That intersection point is illustratively identified as the actual landing point. In an example where the material 110 is landing outside of the receiving vehicle, then image processor 207 identifies a plane corresponding to the surface of the ground. Intersection detector 211 detects an intersection between the trajectory of material 110 and the ground plane as the actual landing point.

In one example, material trajectory sensor 209 and intersection detector 211 can be implemented by a geometric computer vision system which identifies a point in three-dimensional space in either a local or global coordinate system that corresponds to a generally central portion of the stream of material 110 identified in the image. Material trajectory sensor 209 then uses geometric computer vision to move down the material stream, iteratively analyzing different cross sections of the stream, calculating the mean and median values of the amount of material (or material presence) in the stream in the material stream at each cross-section. Material trajectory sensor 209 then fits a curve to the stream based on the mean and median values to identify the trajectory of the stream of material 110.

Once the actual landing point is detected, comparison system 204 compares the actual landing point to the target landing point to determine an offset.

Wind velocity and direction sensor 219 can also generate an output indicative of the wind velocity and direction, based upon the error between the target landing point and the actual landing point. In one example, wind velocity and direction sensor 219 receives an input from a position sensor (such as a GPS receiver or another position sensor) and moisture sensor 177 which generates a sensor signal indicative of the moisture of crop material in agricultural harvester 100. Based upon the information from these sensors, and based upon the kinematics of spout 108 and flap 109, wind velocity and direction sensor 219 generates an estimate of the direction and velocity of the wind. For instance, if the crop material 110 has a first density and the error between the target landing point and the actual landing point is a first distance, then the direction of the wind and the wind velocity can be estimated to be a first wind direction and a first velocity value. However, if the density of the crop material is estimated to be at a second, higher density and the error between the actual landing point and the target landing point is a second distance that is greater than the first distance, then the wind velocity may be estimated to be at a higher velocity than the first velocity. The direction of the wind can be identified by wind velocity and direction sensor 219 based upon the direction of offset of the material from the target landing point and based on the heading of agricultural harvester 100, as indicated by the position sensor. Wind velocity and direction sensor 219 can output the estimated wind direction and velocity to fill control system 156 so it can incorporate the wind direction and velocity in the spout and flap control algorithm, or to other systems as well.

Figure 6:
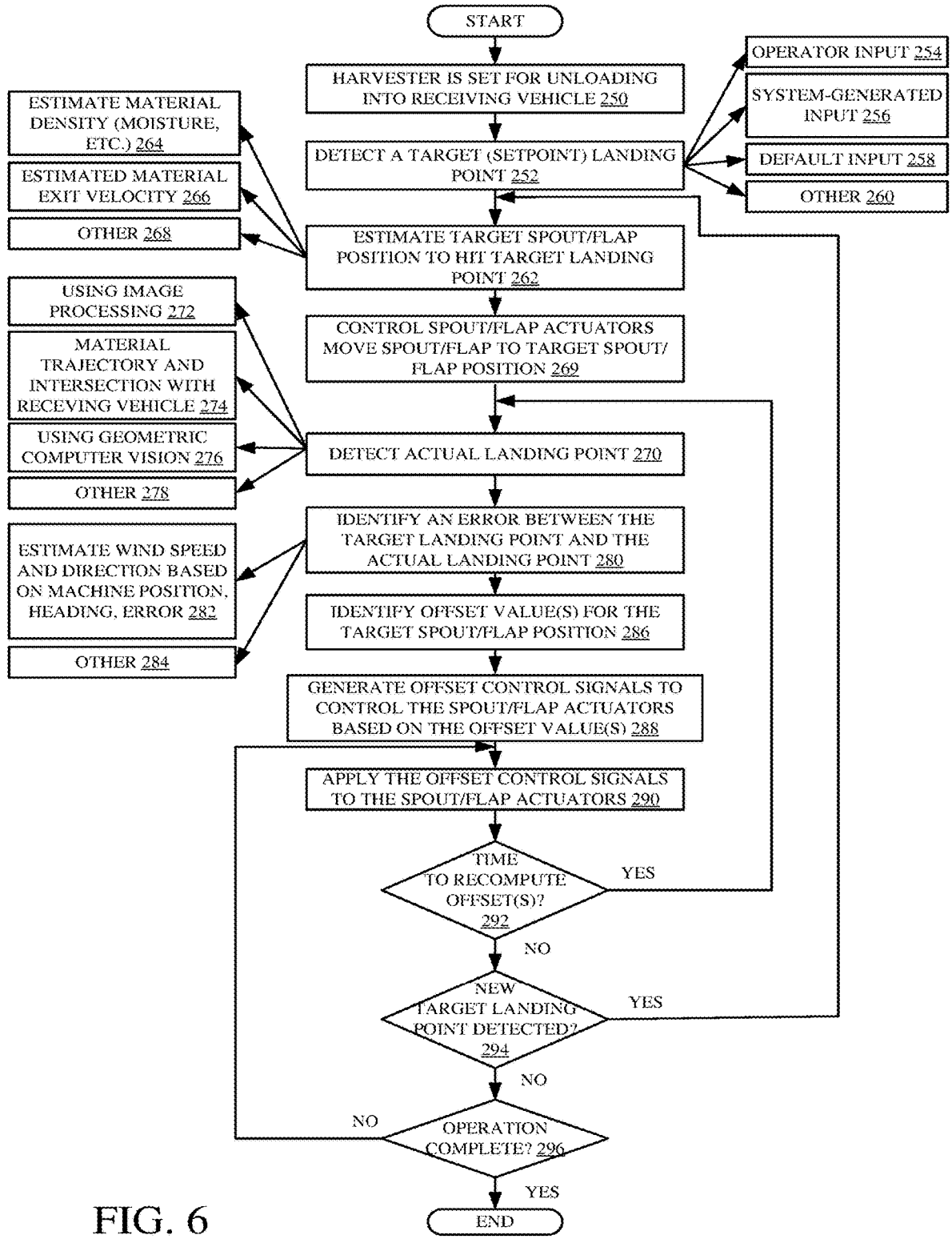
FIG. 6 shows a flow diagram illustrating one example of detecting a difference between a target landing point and an actual landing point and controlling a fill operation based on the difference.

FIG. 6 is a flow diagram illustrating one example of the operation of agricultural harvester 100 in detecting the difference between a target landing point and an actual landing point and automatically adjusting the fill operation to accommodate for that error. It is first assumed that harvester 100 is set for unloading into a receiving vehicle. For purposes of the present discussion, it will be assumed that agricultural harvester 100 is set for unloading into receiving vehicle 102, as indicated by block 250 in the flow diagram of FIG. 6. Fill control system 156 then detects a target (set point) landing point, as indicated by block 252. The target landing point can be provided by an operator input 254 through operator interface mechanisms 160 and detected by manual set point detector 190. The target landing point can be a system generated input that is generated from automatic fill control system 180, as indicated by block 256. The target landing point can be a default input 258, or it can be obtained in another way as indicated by block 260. Fill control system 156 then estimates the target spout and flap positions to hit the target landing point as indicated by block 262. When automatic fill control system 180 is used, automatic fill control system 180 can estimate material density based upon the moisture signal from moisture sensor 177, as indicated by block 264. The automatic fill control system can estimate the material exit velocity as indicated by block 266 and use the spout kinematics to estimate the target spout and flap positions that will be needed to hit the target landing point. The spout and flap positions can also be input by the operator or estimated in other ways as well, as indicated by block 268.

Fill control signal generator 196 then generates control signals to control the spout actuators 214 and flap actuators 216 to move the spout 108 and flap 109 to the target spout and flap positions. Controlling the spout and flap actuators to move them to the target spout and flap positions is indicated by block 269 in the flow diagram of FIG. 6.

Actual landing point detector 202 then detects the actual landing point of material 110, as indicated by block 270. Detecting the actual landing point can include using image processing by image processor 207, as indicated by block 272 in the flow diagram of FIG. 6. Detecting the actual landing point can include estimating the material trajectory of material 110 and the intersection between the trajectory and the plane in which the opening of the receiving vehicle lies, as indicated by block 274. The actual landing point can include using geometric computer vision, as indicated by block 276, and other items, as indicated by block 278.

Comparison system 204 then identifies an error between the target landing point and the actual landing point, as indicated by block 280 in the flow diagram of FIG. 6. Comparison system 204 can identify the distance between the two landing points and the direction of the displacement in a local or global coordinate system. Wind velocity and direction sensor 219 can also estimate wind speed and direction, as discussed above, and as indicated by block 282. The error between the target landing point and the actual landing point can be identified in other ways as well, as indicated by block 284.

Offset control signal generation system 215 then identifies the offset values for the target spout and flap positions based upon the error and the kinematics of the spout 108 and flap 109. Identifying the offset values for the target spout and flap position is indicated by block 286 in the flow diagram of FIG. 6.

Offset control signal generation system 215 then generates the offset control signals that can be used to control the spout actuators 214 and flap actuators 216 based upon the offset values determined at block 286. Generating the offset control signals is indicated by block 288. The output from offset control signal generation system 215 can be provided to fill control system 156 so that fill control signal generator 196 can generate the offsets to actuators 214 and 216. In another example, offset control signal generation system 215 can provide the offset control signals directly to actuators 214 and 216. Applying the control signals to the spout actuators 214 and flap actuators 216 is indicated by block 290 in the flow diagram of FIG. 6.

Once the offsets are applied to actuators 214 and 216, agricultural harvester 100 can continue to apply those offsets, even if the set point or target landing point is changed. For instance, if the automatic fill control system 180 is conducting a front-to-back fill operation, and the target fill point changes, the offsets can continue to be applied. Similarly, if the operator changes the target fill point (such as by touching a touch sensitive display screen, or otherwise) the offsets can be applied to that new target landing point as well.

Also, in one example, the offsets may be periodically or otherwise intermittently, or even continuously, reevaluated based upon the images received from camera 106. For instance, it may be that the offsets are to be updated periodically based upon the magnitude by which the offsets change when they are recalculated. For example, if the offsets change by a larger magnitude, they may be updated more often than if they change by a smaller magnitude. In another example, the offsets may be recalculated on the basis of a constant time interval, or based on other criteria. Therefore, offset control system 158 can determine whether it is time to update the offsets, as indicated by block 292 in the flow diagram of FIG. 6. If it is time to update the offset values, then processing can revert to block 270 where the actual landing point is detected.

If it is not time for the offsets to be updated, at block 292, then fill control system 186 may detect that the target landing point (or set point) has been changed, as indicated by block 294. Again, this may be based on an operator input, a system-generated input, a default input, or in another way. If the target landing point has been detected, then processing can revert to block 262 where the new spout and flap positions are estimated and where the spout and flap actuators are controlled to move the spout and flap to those positions.

If it is not time to update the offsets at block 292, and if the target landing point has not changed, then processing continues at block 290 where the offset control signals are applied to actuators 214 and 216, as indicated by block 296.

It can thus be seen that the present system automatically detects an error between the target landing point of material and the actual landing point. The error between the target landing point and actual landing point can be used, in a closed-loop fashion, to control either the spout and flap positions or the relative positions between the loading vehicle (e.g., agricultural harvester 100) and the receiving vehicle (e.g., cart 102).

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
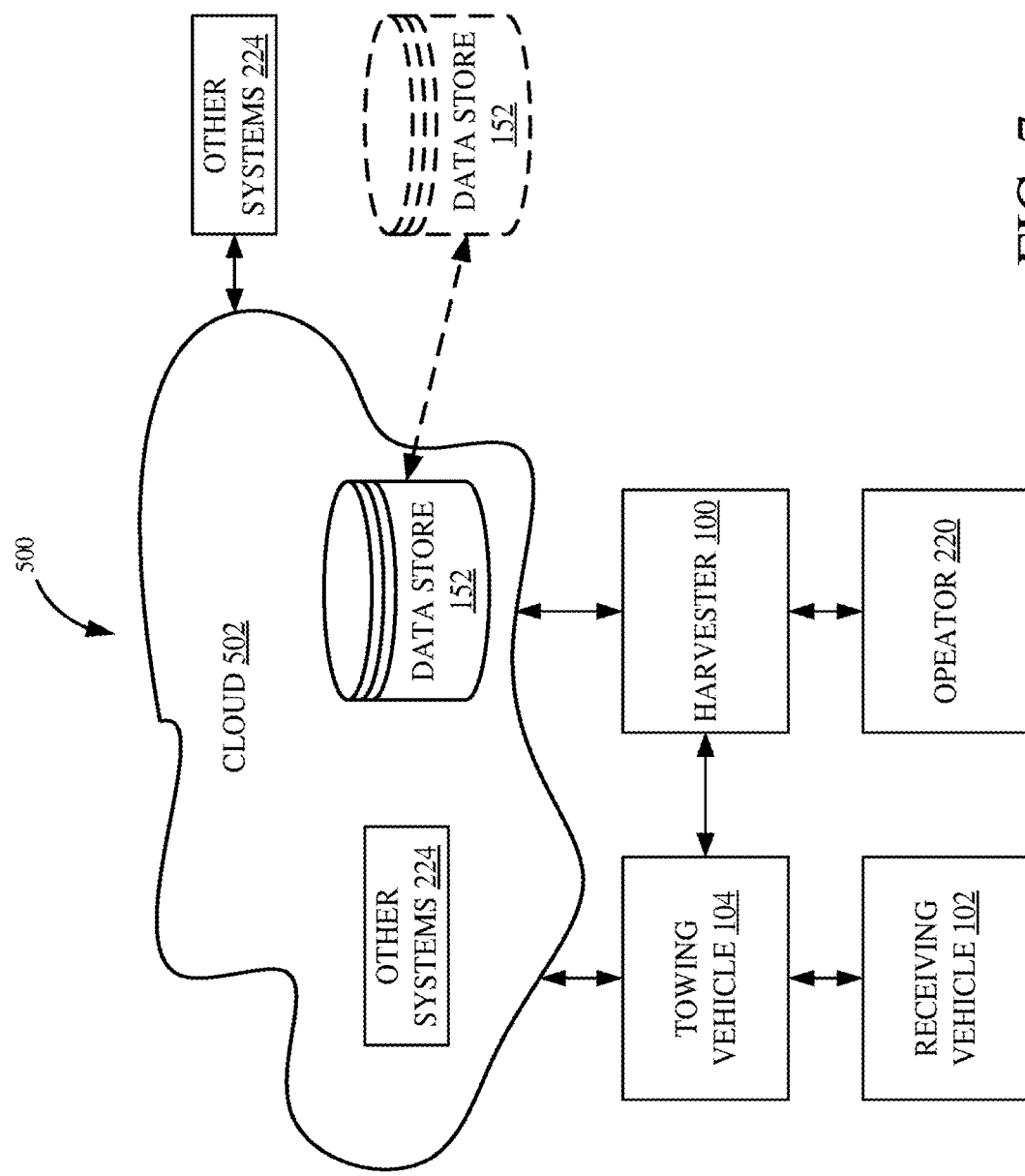
FIG. 7 shows a block diagram of a harvester in a remote server architecture.

FIG. 7 is a block diagram of harvester 100, shown in FIGS. 1-5, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1-5 as well as the corresponding data, can be stored on servers at a remote location. The computing resources in a remote server environment can be consolidated at a remote data center location or they can be dispersed. Remote server infrastructures can deliver services through shared data centers, even though the servers appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 7, some items are similar to those shown in FIGS. 1-5 and they are similarly numbered. FIG. 7 specifically shows that data store 152, other systems 224, and other parts of the harvester 100 shown in FIG. 5 can be located at a remote server location 502. Therefore, harvester 100 accesses those systems through remote server location 502.

FIG. 7 also depicts another example of a remote server architecture. FIG. 7 shows that it is also contemplated that some elements of FIGS. 1-5 are disposed at remote server location 502 while others are not. By way of example, data store 152 or other systems 224 can be disposed at a location separate from location 502, and accessed through the remote server at location 502. Regardless of where the items are located, the items can be accessed directly by harvester 100, through a network (such as a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester 100 comes close to the fuel truck for fueling, the system automatically collects the information from the harvester 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester 100 until the harvester 100 enters a covered location. The harvester 100, itself, can then send the information to the main network.

It will also be noted that the elements of FIGS. 1-5 or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
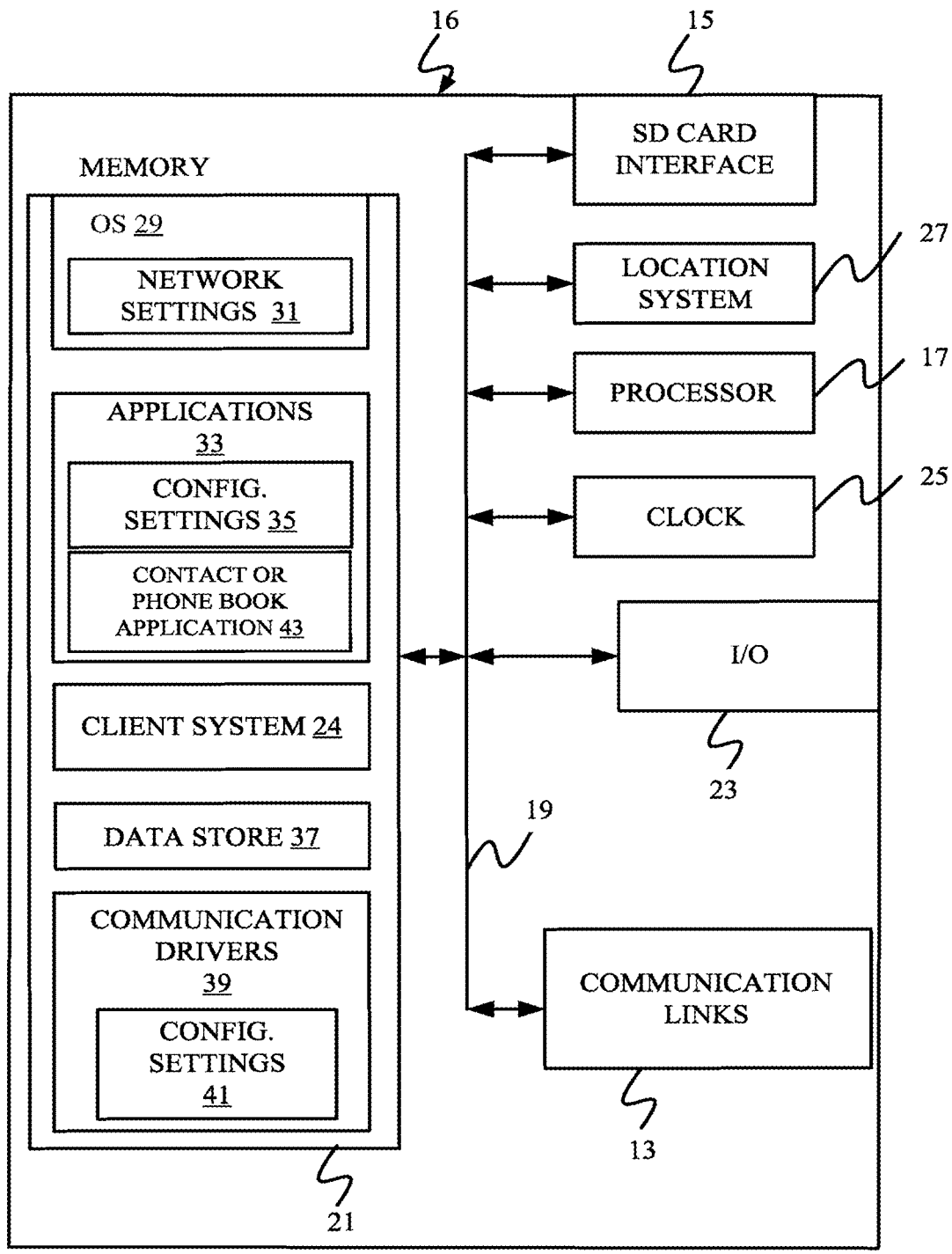
FIGS. 8-10 show examples of mobile devices that can be used in harvesters.
Figure 9:
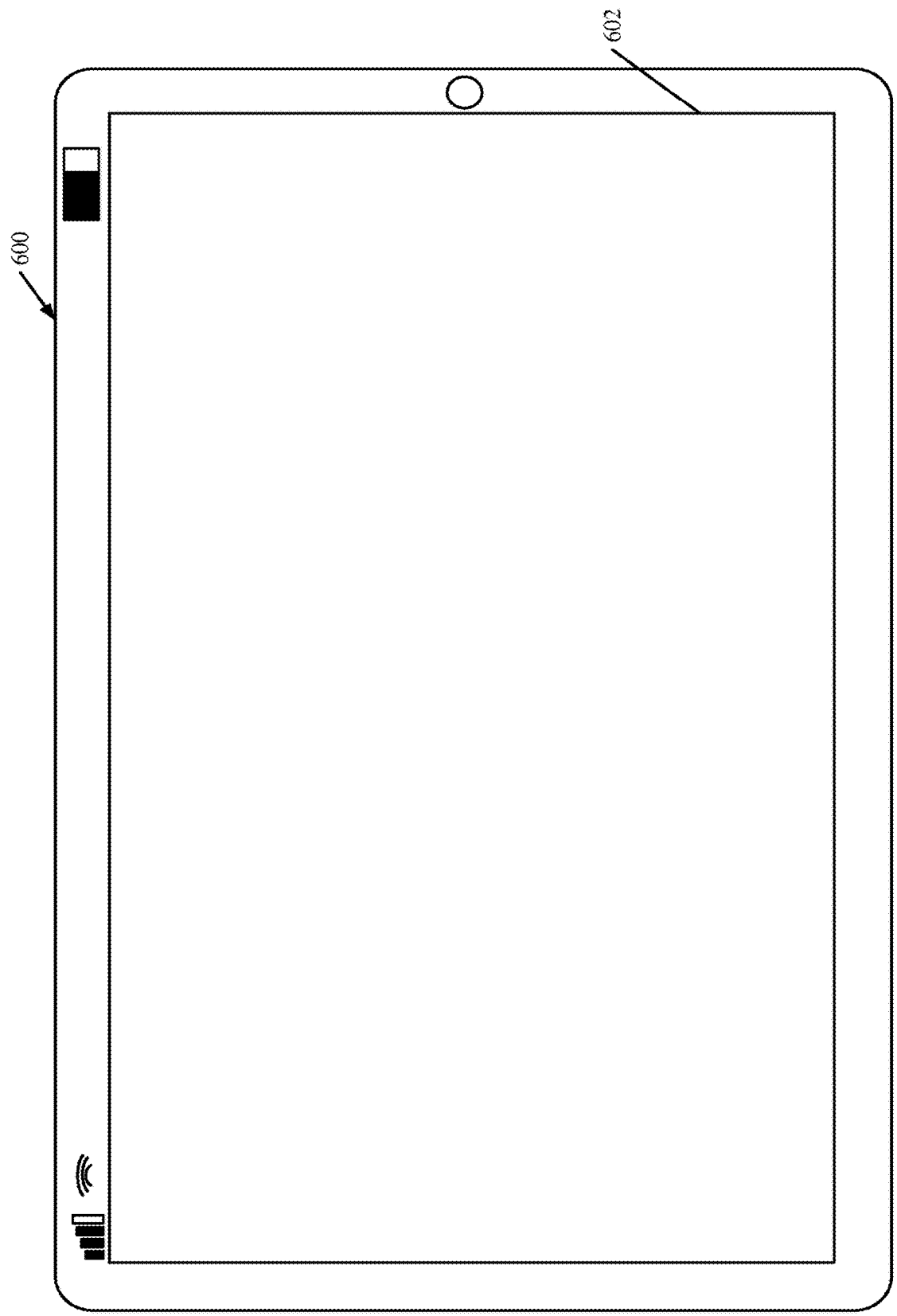
Figure 10:
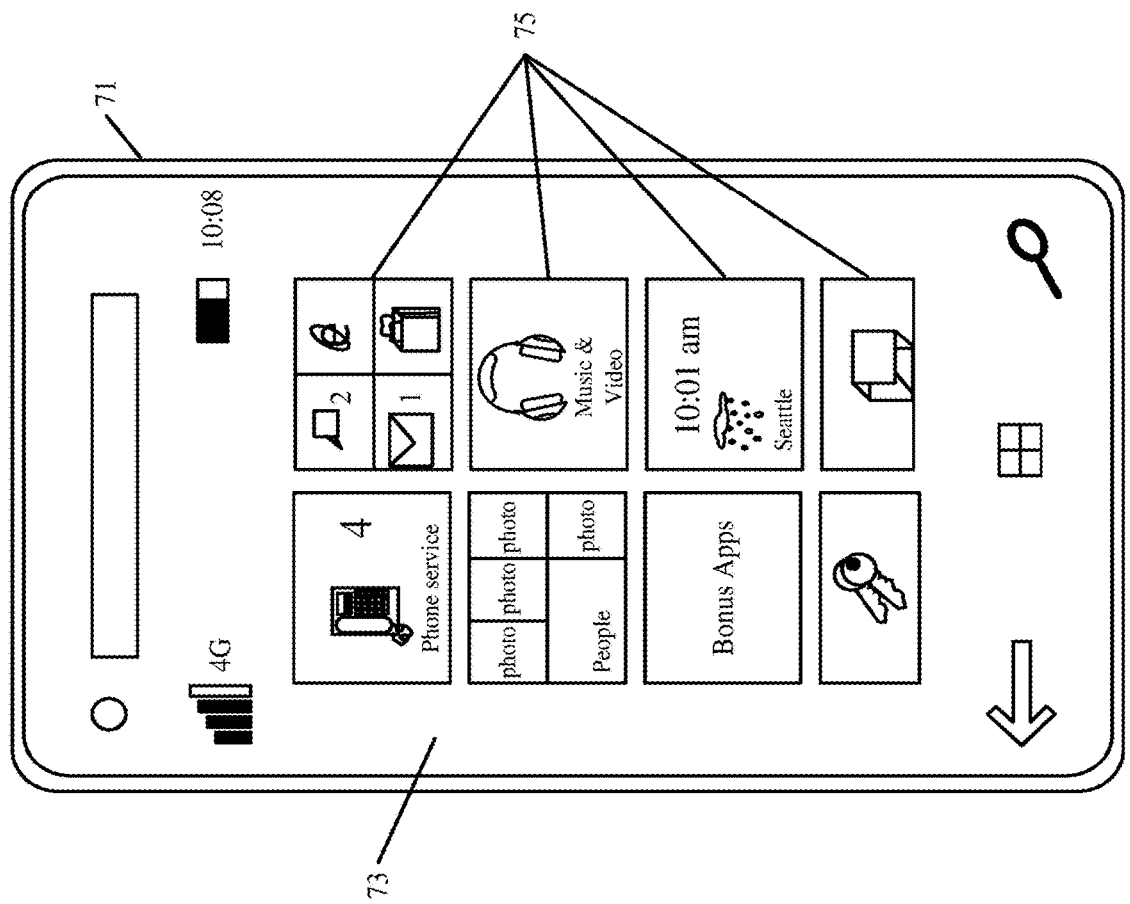

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the spout and flap and turn data. FIGS. 9-10 are examples of handheld or mobile devices.

FIG. 8 provides a general block diagram of the components of a client device 16 that can run some components shown in FIG. 5, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors/servers from previous FIGS.) along a bus 19 that is also connected to memory 21 and input/output (I/O) components 23, as well as clock 25 and location system 27.

I/O components 23, in one example, are provided to facilitate input and output operations. 1/components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
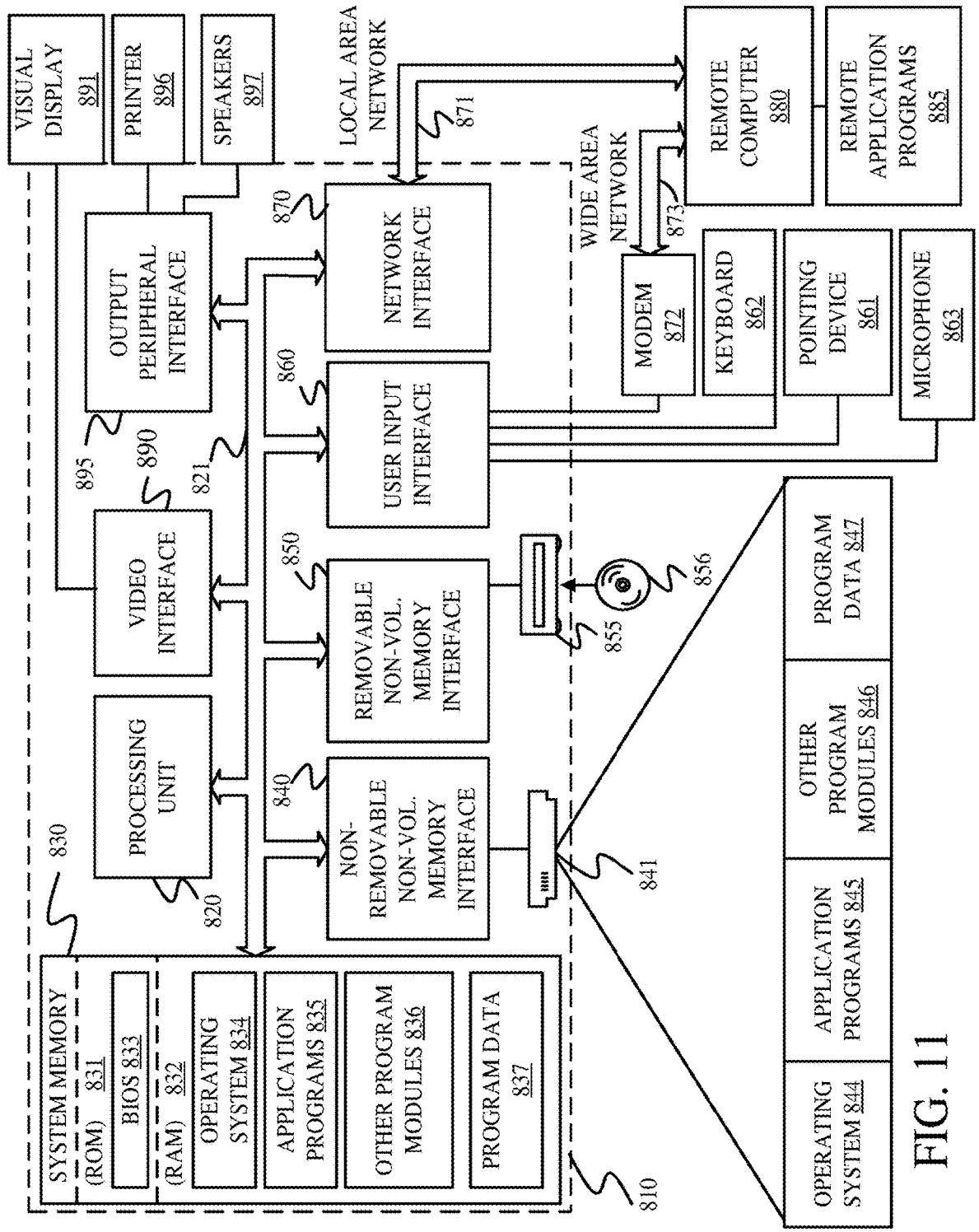
FIG. 11 is a block diagram of a computing environment that can be used in the machines, systems, and architectures shown and discussed with respect to the previous figures.

FIG. 11 is one example of a computing environment in which elements of FIGS. 1-5, or parts of it, (for example) can be deployed. With reference to FIG. 11, an example system for implementing some embodiments includes a computing device in the form of a computer 810 programmed to operate as discussed above. Components of computer 810 may include, but are not limited to, a processing unit 820 (which can comprise processor or servers from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1-5 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a material loading vehicle, comprising:
a frame;
a spout actuator;
a spout configured to be positioned by the spout actuator at a position relative to the frame of the material loading vehicle to provide material to a receiving vehicle;
a current landing point detector sensing a current landing point of the material and identifying a difference between a target landing point and the current landing point; and
a control system configured to generate an offset signal indicative of the difference between the target landing point and the current landing point and control a position of the spout relative to the receiving vehicle based on the offset signal.

Example 2 is the material loading vehicle of any or all previous examples wherein the current landing point detector comprises:
an image capture device configured to capture an image of a material stream of the material provided to the receiving vehicle.

Example 3 is the material loading vehicle of any or all previous examples wherein the current landing point detector comprises:
a material trajectory sensor configured to identify a trajectory of the material stream based on the image of the material stream.

Example 4 is the material loading vehicle of any or all previous examples wherein the current landing point detector comprises:
an intersection detector configured to identify a planar surface corresponding to a surface on which the material is currently landing.

Example 5 is the material loading vehicle of any or all previous examples wherein the intersection detector is configured to identify, as the current landing point, an intersection point between the trajectory of the material stream and the planar surface corresponding to the surface on which the material is currently landing.

Example 6 is the material loading vehicle of any or all previous examples wherein the control system is configured to control the spout actuator based on the offset signal.

Example 7 is the material loading vehicle of any or all previous examples wherein the control system comprises:
a machine synchronization fill control system configured to provide an indication of the offset signal to the receiving vehicle to implement repositioning of the receiving vehicle relative to a position of the material loading vehicle.

Example 8 is the material loading vehicle of any or all previous examples and further comprising:
a wind velocity and direction sensor configured to receive a position signal indicative of a position of the material loading vehicle and identify an estimate of wind direction and velocity based on the position of the material loading vehicle and the difference between the target landing point and the current landing point.

Example 9 is the material loading vehicle of any or all previous examples wherein the wind velocity and direction sensor is configured to generate a wind direction and velocity signal indicative of the estimate of the wind direction and velocity and provide the wind direction and velocity signal to a machine control system of the material loading vehicle.

Example 10 is a method of controlling a material loading vehicle, comprising:
detecting a target landing point of material provided through a spout from a material loading vehicle to a receiving vehicle;
controlling a spout position actuator to position the spout based on the detected target landing point;
sensing a current landing point of the material;
generating a current landing point signal identifying the current landing point;
identifying a difference between the target landing point and the current landing point based on the current landing point signal;
generating an offset signal indicative of the difference between the target landing point and the current landing point;
controlling a position of the spout relative to the receiving vehicle based on the offset signal.

Example 11 is the method of any or all previous examples wherein controlling a position of the spout relative to the receiving vehicle comprises:
controlling the spout position actuator based on the offset signal.

Example 12 is the method of any or all previous examples wherein sensing a current landing point comprises:
capturing an image of a material stream of the material provided to the receiving vehicle.

Example 13 is the method of any or all previous examples wherein sensing a current landing point comprises:
identifying a trajectory of the material stream based on the image of the material stream.

Example 14 is the method of any or all previous examples wherein sensing a current landing point comprises:
identifying a planar surface corresponding to a surface on which the material is currently landing.

Example 15 is the method of any or all previous examples wherein sensing a current landing point comprises:
identifying, as the current landing point, an intersection point between the trajectory of the material stream and the planar surface corresponding to the surface on which the material is currently landing.

Example 16 is the method of any or all previous examples wherein controlling a position of the spout relative to the receiving vehicle comprises:
providing an indication of the offset signal to the receiving vehicle to implement repositioning of a position of the receiving vehicle relative to a position of the material loading vehicle.

Example 17 is the method of any or all previous examples and further comprising:
receiving a position signal indicative of a position of the material loading vehicle; and identifying an estimate of wind direction and velocity based on the position of the material loading vehicle and the difference between the target landing point and the current landing point.

Example 18 is the method of any or all previous examples and further comprising:

generating a wind direction and velocity signal indicative of the estimate of the wind direction and velocity to a machine control system of the material loading vehicle.

Example 19 is the method of any or all previous examples wherein detecting a target landing point comprises at least one of:

detecting an operator input indicative of the target landing point; or detecting an input indicative of the target landing point from an automatic fill control system.

Example 20 is an agricultural harvester, comprising:

a frame;

a spout actuator;

a spout configured to be positioned by the spout actuator at a position relative to the frame of the agricultural harvester to provide material to a receiving vehicle;

a current landing point detector sensing a current landing point of the material and identifying a difference between a target landing point and the current landing point; and a control system configured generate an offset signal indicative of the difference between the target landing point and the current landing point and control a position of the spout relative to the receiving vehicle based on the offset signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A material loading vehicle, comprising:

a frame;

one or more unloading apparatus actuators;

an unloading apparatus configured to be positioned, by the one or more unloading apparatus actuators, relative to the frame of the material loading vehicle to provide material to a receiving vehicle;

a current landing point detector sensing a current landing point of the material and identifying a difference between a target landing point and the current landing point; and a control system configured generate an output to change a relative positioning between the material loading vehicle and the receiving vehicle based on the difference between the target landing point and the current landing point.

2. The material loading vehicle of claim 1, wherein the current landing point detector comprises an image capture device configured to capture an image that includes a stream of the material.

3. The material loading vehicle of claim 2, wherein the current landing point detector comprises:

a material trajectory sensor configured to identify a trajectory of the stream of the material based on the image; and an intersection detector configured to:

identify a planar surface corresponding to a surface on which the material is currently landing; and identify, as the current landing point, an intersection point between the trajectory of the stream of material and the planar surface corresponding to the surface on which the material is currently landing.

4. The material loading vehicle of claim 1, wherein the output comprises a control signal that controls a propulsion subsystem of the material loading vehicle to change a speed of the material loading vehicle in order to change the relative positioning between the material loading vehicle and the receiving vehicle.

5. The material loading vehicle of claim 1, wherein the unloading apparatus includes one or more of a spout or a flap;

wherein the one or more unloading apparatus actuators include one or more of a spout actuator configured to position the spout relative to the frame of the material loading vehicle or a flap actuator configured to position the flap relative to the frame of the material loading vehicle; and wherein the output comprises one or more control signals, the one or more control signals including one or more of:

a first control signal that controls the spout actuator to change a position of the spout relative to the frame of the material loading vehicle in order to change the relative positioning between the material loading vehicle and the receiving vehicle; or a second control signal that controls the flap actuator to change a position of the flap relative to the frame of the material loading vehicle in order to change the relative positioning between the material loading vehicle and the receiving vehicle.

6. The material loading vehicle of claim 1, wherein the output comprises an indication of the difference between the target landing point and the current landing point and wherein the control system is configured to provide the indication to the receiving vehicle to implement repositioning of the receiving vehicle in order to change the relative positioning between the material loading vehicle and the receiving vehicle.

7. The material loading vehicle of claim 1, wherein the output comprises an indication of direction in which the receiving vehicle should reposition and wherein the control system is configured to provide the indication to the receiving vehicle to implement repositioning of the receiving vehicle to.

8. The material loading vehicle of claim 1, wherein the output comprises an indication of a change in speed of the receiving vehicle and wherein the control system is configured to provide the indication to the receiving vehicle to implement repositioning of the receiving vehicle.

9. An agricultural system configured to control relative positioning between a receiving vehicle and a material loading vehicle comprising:

a sensor configured to sense a current landing point of material provided by the material loading vehicle to the receiving vehicle and to generate sensor data indicative of the current landing point of the material;

one or more processors; and memory storing instructions executable by the one or more processors that, when executed by the one or more processors, cause the one or more processors to perform steps comprising:

identifying a difference between a target landing point and the current landing point based on the sensor data;

generating an offset signal indicative of the difference between the target landing point and the current landing point; and controlling one or more of the receiving vehicle or the material loading vehicle to change a relative positioning between the receiving vehicle and the material loading vehicle.

10. The agricultural system of claim 9, wherein the sensor comprises an image capture device configured to capture an image that includes a stream of the material.

11. The agricultural system of claim 10, wherein identifying the difference between the target landing point and the current landing point comprises:

identifying a trajectory of the stream of the material based on the image; and identifying a planar surface corresponding to a surface on which the material is currently landing; and identifying, as the current landing point, an intersection point between the trajectory of the stream of material and the planar surface corresponding to the surface on which the material is currently landing.

12. The agricultural system of claim 9, wherein controlling comprises controlling the material loading vehicle to change a speed of the material loading vehicle in order to change the relative positioning between the receiving vehicle and the material loading vehicle.

13. The agricultural system of claim 9, wherein controlling comprises controlling the receiving vehicle to change a speed of the receiving vehicle in order to change the relative positioning between the receiving vehicle and the material loading vehicle.

14. The agricultural system of claim 9, wherein controlling comprises controlling one or more actuators to actuate an unloading apparatus of the material loading vehicle in order to change the relative positioning between the receiving vehicle and the material loading vehicle.

15. A computer implemented method of controlling relative positioning between a receiving vehicle and a material loading vehicle, the computer implemented method comprising:

sensing a current landing point of material provided by the material loading vehicle to the receiving vehicle and to generate sensor data indicative of the current landing point of the material;

identifying a difference between a target landing point and the current landing point based on the sensor data;

generating an offset signal indicative of the difference between the target landing point and the current landing point; and controlling one or more of the receiving vehicle or the material loading vehicle to change a relative positioning between the receiving vehicle and the material loading vehicle.

16. The computer implemented method of claim 15, wherein sensing the current landing point comprises capturing an image of stream of the material provided by the material loading vehicle to the receiving vehicle.

17. The computer implemented method of claim 16, wherein identifying the difference between the target landing point and the current landing point comprises:

identifying a trajectory of the stream of the material based on the image; and identifying a planar surface corresponding to a surface on which the material is currently landing; and identifying, as the current landing point, an intersection point between the trajectory of the stream of material and the planar surface corresponding to the surface on which the material is currently landing.

18. The computer implemented method of claim 15, wherein controlling comprises controlling the material loading vehicle to change a speed of the material loading vehicle in order to change the relative positioning between the receiving vehicle and the material loading vehicle.

19. The computer implemented method of claim 15, wherein controlling comprises controlling the receiving vehicle to change a speed of the receiving vehicle in order to change the relative positioning between the receiving vehicle and the material loading vehicle.

20. The computer implemented method of claim 15, wherein controlling comprises controlling one or more actuators to actuate an unloading apparatus of the material loading vehicle in order to change the relative positioning between the receiving vehicle and the material loading vehicle.

* * * * *